US009676209B2

(12) United States Patent
Veis (10) Patent No.: US 9,676,209 B2
(45) Date of Patent: Jun. 13, 2017

(54) INKJET PRINTING APPARATUS AND A METHOD FOR PRINTING ULTRAVIOLET (UV) CURABLE INK (75) Inventor: Alex Veis, Kadima (IL)

(73) Assignee: Hewlett-Packard Development Company, L.P., Houston, TX (US)

(*) Notice: Subject to any disclaimer, the term of this patent is extended or adjusted under 35 U.S.C. 154(b) by 630 days.

(21) Appl. No.: 13/806,502

(22) PCT Filed: Jul. 29, 2010

(86) PCT No.: PCT/US2010/043636
§ 371 (c)(1),
(2), (4) Date: Dec. 21, 2012

(87) PCT Pub. No.: WO2012/015407
PCT Pub. Date: Feb. 2, 2012

(65) Prior Publication Data
US 2013/0113868 A1 May 9, 2013

(51) Int. Cl.
B41J 11/00 (2006.01)
B41M 7/00 (2006.01)
C09D 11/101 (2014.01)

(52) U.S. Cl.
CPC .......... B41J 11/002 (2013.01); B41J 11/0015 (2013.01); B41M 7/0081 (2013.01); C09D 11/101 (2013.01)

(58) Field of Classification Search
CPC ........ B41J 2/01; B41J 11/0015; B41J 11/002; B41M 7/0072; C09D 11/101
USPC .................................................... 347/96, 102
See application file for complete search history.

(56) References Cited

U.S. PATENT DOCUMENTS

| 2004/0135159 A1 | 7/2004 | Siegel |
| 2004/0189772 A1* | 9/2004 | Arai ............................... 347/102 |
| 2005/0093952 A1* | 5/2005 | Hoshino ........................ 347/102 |
| 2005/0190248 A1* | 9/2005 | Konno et al. ................. 347/102 |
| 2006/0075917 A1* | 4/2006 | Edwards ....................... 101/483 |
| 2006/0119686 A1 | 6/2006 | Odell |
| 2006/0238592 A1* | 10/2006 | Kadomatsu et al. ......... 347/102 |
| 2007/0024684 A1* | 2/2007 | Konno et al. ................... 347/95 |
| 2007/0024686 A1* | 2/2007 | Kadomatsu et al. ......... 347/102 |
| 2008/0074482 A1* | 3/2008 | Makuta et al. ............... 347/102 |
| 2008/0081116 A1* | 4/2008 | Makuta et al. ............. 427/372.2 |
| 2008/0084466 A1* | 4/2008 | Makuta et al. ............... 347/102 |
| 2008/0192100 A1 | 8/2008 | Nakajima |

(Continued)

OTHER PUBLICATIONS

International Searching Authority. International Search Report and Written Opinion, PCT/US2010/043636, 11 pages, Aug. 5, 2010.

Primary Examiner — Bradley Thies
(74) Attorney, Agent, or Firm — Dierker & Kavanaugh, P.C.

(57) ABSTRACT

An inkjet printing apparatus (10, 10', 10", 100, 100') for printing ultraviolet (UV) curable ink (12) includes a printhead assembly (26) for printing the UV curable ink (12) on a substrate (14); a UV radiation source (20) for pinning the UV curable ink (12) printed on the surface of the substrate (14); a liquid coating unit (22) for dispensing a liquid coating (16) on the printed and pinned UV curable ink (12, 12'); and an ink curing unit (28) for fully curing the printed, pinned, and coated UV curable ink (12, 12'). The liquid coating (16) prevents contact between atmospheric oxygen and the printed and pinned UV curable ink (12, 12').

12 Claims, 4 Drawing Sheets (56) References Cited

U.S. PATENT DOCUMENTS

2008/0218570 A1 9/2008 Kovacs et al.
2008/0311299 A1* 12/2008 Furukawa .................... 427/261
2010/0156971 A1* 6/2010 Ikeda et al. ...................... 347/9

* cited by examiner

INKJET PRINTING APPARATUS AND A METHOD FOR PRINTING ULTRAVIOLET (UV) CURABLE INK

BACKGROUND

The present disclosure relates generally to an inkjet printing apparatus and a method for printing UV curable ink.

Inkjet printing is widely used for printing of small scale projects, such as personal photographs, documents, etc., and large scale projects, such as billboards, banners and point of sale displays. Inkjet printing involves manipulation of ink drops ejected from an orifice or a number of orifices of a printhead onto an adjacent print substrate. Relative movement between the substrate and the printhead enables substrate coverage and image creation. When inkjet printing is used to print with ultraviolet (UV) curable inks, the printed inks are cured to form the final image. UV curable inks are popular because they generate lightproof and waterproof images, and images printed with UV curable inks are typically characterized by vivid colors. Ink curing generally requires large amounts of UV radiation and therefore powerful UV sources are used.

BRIEF DESCRIPTION OF THE DRAWINGS

Features and advantages of embodiments of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Embodiments of the system disclosed herein create an inert environment during a UV printing process using a liquid instead of an inert gas. The deposited liquid tends to cover the printed and pinned UV curable ink, even when the printing process is performed in open air. As such, the deposited liquid prevents oxygen present in the environment from contacting the printed and pinned UV curable ink.

This liquid barrier prohibits oxygen inhibition by the ink in the course of the curing process. In one or more embodiments disclosed herein, the liquid is also selected to be at least transparent to the UV radiation used at least for curing. This enables the printed UV curable ink to be fully cured while the liquid covers the UV ink. As such, the embodiments disclosed herein utilize a liquid to provide an oxygen free environment for efficient formation of prints with UV curable inks.

Figure 1:
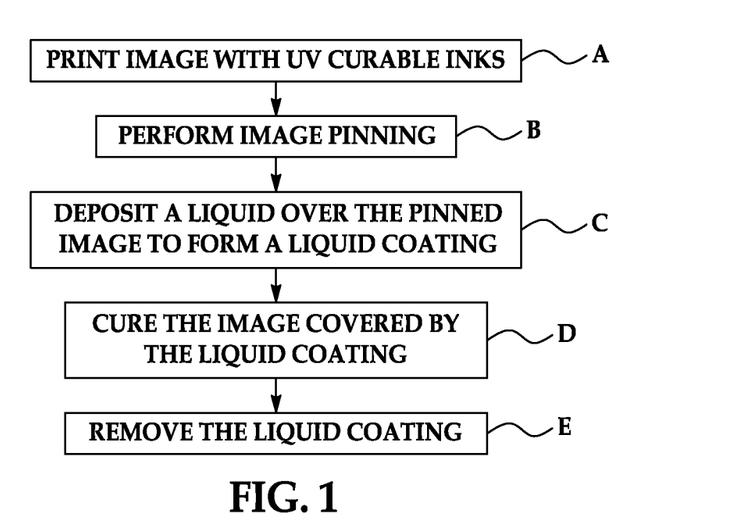
FIG. 1 is a flow diagram of an embodiment of the printing method disclosed herein.

FIG. 1 depicts an embodiment of the printing method disclosed herein that can be performed using any one of the printing apparatuses disclosed herein. As shown at reference letter A, the method begins by printing an image (e.g., alphanumeric characters, graphics, etc.) using one or more UV curable inks. Any suitable UV curable ink may be used, and the ink(s) are printed onto any suitable substrate. Coated or uncoated papers, vinyl, textiles, fabrics, and others are non-limiting examples of suitable printing substrates. Embodiments of the printing apparatuses suitable for printing the UV curable ink(s) on the substrate are further described in reference to FIG. 3A through FIG. 6.

Once the ink(s) is/are printed, the image is pinned, as shown at reference letter B. Pinning is a process that involves exposing the printed UV curable ink to UV radiation having energy sufficient to form a crust at the surface of the printed ink without fully curing the printed ink. Pinning may be accomplished using a UV radiation source, which is generally any low power UV radiation source. The low power UV radiation source is capable of emitting radiation having an intensity that ranges from about 5% to about 10% of the power typically required to cure UV curable inks in conventional curing processes that take place in the presence of atmospheric oxygen. In one embodiment, the UV radiation source is capable of emitting at least about 5 mj/cm$^2$ of UV energy. In another embodiment, the UV radiation source is capable of emitting at least about 10 mj/cm$^2$ of UV energy. In some instances, the UV source is capable of emitting up to 70 mj/cm$^2$ of UV energy. Non-limiting examples of suitable UV radiation sources include UV arc lamps, LED lamps, or fluorescent lamps. It is to be understood that the time for pinning will depend upon the power of the UV radiation source and the speed of the printhead or carriage and/or the speed of the substrate.

After the ink is pinned, a liquid is deposited on the pinned image to form a liquid coating on the pinned image, as shown at reference letter C. The liquid is any suitable liquid that i) is transparent to UV radiation that is to be used for curing and ii) forms a barrier that prevents atmospheric oxygen from contacting the printed UV ink. The liquid is transparent to UV radiation so that the underlying printed UV ink can be cured while the liquid remains coated on the ink. As such, the liquid selected is at least transparent to the UV spectral range used for final curing. In some instances, described further herein, the liquid may also be absorbing of infrared (IR) radiation.

One non-limiting example of a suitable liquid is water. Other examples of suitable liquids include, but are not limited to mixtures of water and alcohol (e.g., containing less than 5 wt % alcohol), or mixtures of water and specially engineered liquids from DuPont or 3M (e.g., DuPont VERTREL® MCA, a proprietary azeotrope of DuPont VERTREL® XF and trans-1,2 dichloroethylene). Still other non-limiting examples may include alcohols (e.g., ethanol, isopropanol (IPA), etc.) or ethers. In one embodiment, water alone or an alcohol alone is used as the liquid. In another embodiment, the liquid is present in a solution that also contains a surfactant. The presence of the surfactant aids in obtaining the desirable coverage of the liquid on the pinned ink and on the substrate. The surfactant selected may be transparent to at least the wavelengths of UV radiation used for final curing. However, due to the small amount of surfactant that is included, it is believed that opaque surfactants may also be used. Suitable surfactants include fluorosurfactants, such as DX4000 and DX4010 from Dynax Corp., Pound Ridge, N.Y. When a fluorosurfactant is used, the amount included ranges from about 0.1 wt % to about 0.5 wt %.

The liquid or liquid/surfactant solution is deposited via any suitable liquid coating unit. The liquid or solution is introduced into the liquid coating unit, and is dispensable from the liquid coating unit directly onto a substrate. Non-limiting examples of liquid coating units include a spraying unit, a roller coating unit, a meniscus coating unit, and one or more inkjet printing units. The amount of liquid or solution that is deposited will depend upon the amount of UV curable ink that is printed, and the area of the substrate covered with the printed UV curable ink. Generally, enough liquid or solution is deposited to cover the printed UV curable ink. The thickness of the resulting liquid coating will depend upon the amount of liquid or solution dispensed. In one embodiment, the thickness of the liquid coating ranges from about 1 micron to about 5 microns. In another embodiment, the thickness of the liquid coating is up to 10 microns. However, thickness of the liquid coating is selected to provide a barrier to oxygen penetration of the underlying image while also allowing relatively fast and easy removal.

Figure 2A:
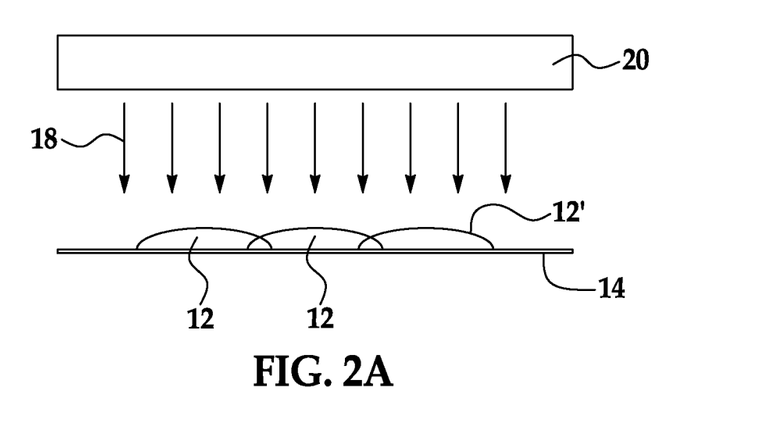
FIGS. 2A and 2B are schematic diagrams of an embodiment of an ink pinning process and a liquid coating deposition process according to an embodiment of the method disclosed herein.
Figure 2B:
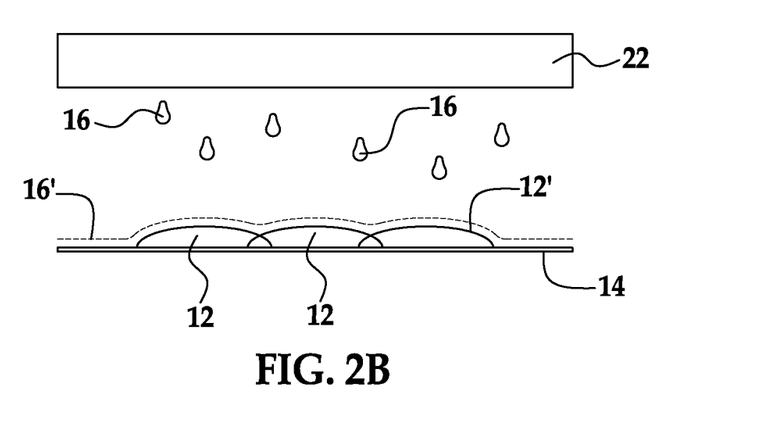

FIGS. 2A and 2B schematically illustrate the pinning and liquid deposition processes, respectively. As shown in FIG. 2A, the UV curable ink 12 is printed on the substrate 14 to form any desirable image. The UV radiation source 20 applies UV radiation 18 of a sufficient power to pin the ink 12 without fully curing the ink 12. The pinning radiation 18 forms a cured ink crust 12'. As shown in FIG. 2B, after the ink 12 is pinned and the crust 12' is formed, the liquid 16 is deposited over the pinned ink 12, 12' to form a liquid coating 16'. The liquid 16 is dispensed from the liquid coating unit 22.

Referring back to FIG. 1, after the UV curable ink 12 is deposited, pinned, and coated with liquid coating 16, the method further includes curing the ink 12 covered by the liquid coating 16 (see reference letter D). The intensity required to cure ink having no contact with oxygen is lower than the intensity required to cure ink that is in contact with oxygen. As such, in one embodiment, the curing unit and the UV pinning source 20 may be the identical kind/type of device or similar kinds/types of devices. In still another embodiment, the curing unit is a separate and may be a more powerful device than the UV pinning source 20. A more powerful curing unit is generally desirable when the production of IR radiation is capable of evaporating the liquid coating during curing (discussed further hereinbelow). Non-limiting examples of suitable curing units include UV arc lamps, LED lamps, or UV fluorescent lamps. It is to be understood that the time for curing will depend upon the power of the UV radiation source and the speed of the printhead or carriage and/or the speed of the substrate. In one embodiment, curing ranges from about 1 ms to about 100 ms.

The liquid coating 16 is then removed, as shown at reference letter E of FIG. 1. Almost all of the operations may be concurrent operations; however, these operations are performed simultaneously on different image segments (i.e., one image segment is pinned while another previously pinned image segment has the liquid coating deposited thereon, and another image segment is finally cured and has the liquid removed therefrom). When the curing unit also operates as the liquid removal (evaporation) unit, the curing and liquid removal processes depend on the power of the curing/liquid removal source and the area/segment of the image covered by the radiation. In one embodiment, the liquid coating 16 is thin enough that it will evaporate on its own in the course of the curing of the ink 12. In this embodiment, a separate liquid removal unit may not be included in the printing apparatus. In other embodiments however, the removal of the liquid coating 16 may be accomplished via a liquid removal unit, which is either a separate unit that is configured to remove the liquid coating 16, or is part of the curing unit. The liquid removal unit is any suitable drying device that will remove the liquid coating without deleteriously affecting the UV curable ink 12. Non-limiting examples of separate liquid removal units include suction units, sweeping units, and IR radiation sources. An example of a suction unit includes, but is not limited to a vacuum that can suck up the liquid coating 16 without deleteriously affecting the cured ink. An example of a sweeping unit includes, but is not limited to a mechanical device that can wipe up the liquid coating without deleteriously affecting the cured ink. An example of an IR radiation source is an IR lamp that generates enough heat to evaporate the liquid coating 16. As such, a separate IR radiation source may be selected as the separate liquid removal unit when the liquid (or solution) used is capable of absorbing IR radiation. If the liquid or solution used does not absorb IR radiation, it is to be understood that another liquid removal unit (e.g., suction unit, sweeping unit, etc.) will be used because the liquid or solution will not be heated and evaporated. Additional liquid removal units may also be used in instances where the liquid is not fully evaporated via IR radiation. One other non-limiting example of a liquid removal unit is a hot air fan. When the fluid removal unit is "part of" the curing unit, it is meant that a single unit/device is configured to both cure the ink 12 and remove the liquid coating 16. A non-limiting example of a single ink curing and fluid removal unit 32 is shown in both FIGS. 3A, 3B, and 5, and includes a UV radiation source that also generates IR radiation/heat (e.g., a UV lamp that emits from 15% to 18% UV radiation and from 82% to 85% IR radiation).

After the liquid coating 16 is removed, the substrate 14 having the cured image printed thereon exits the printing apparatus. Example embodiments of printing apparatuses that can perform the various steps of the method shown in FIG. 1 will now be described in reference to FIGS. 3A through 6.

Figure 3A:
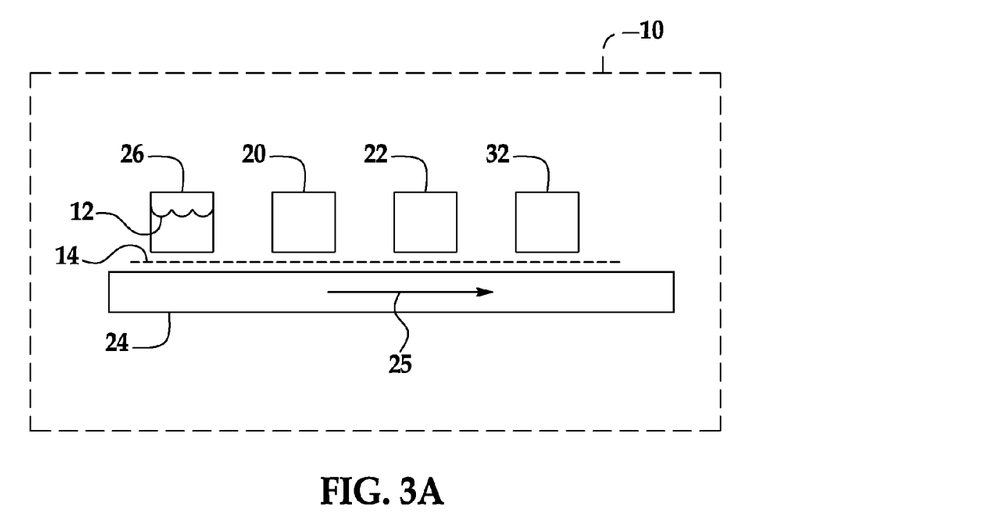
FIGS. 3A and 3B are schematic diagrams of embodiments of a flat bed UV printing apparatus.
Figure 3B:
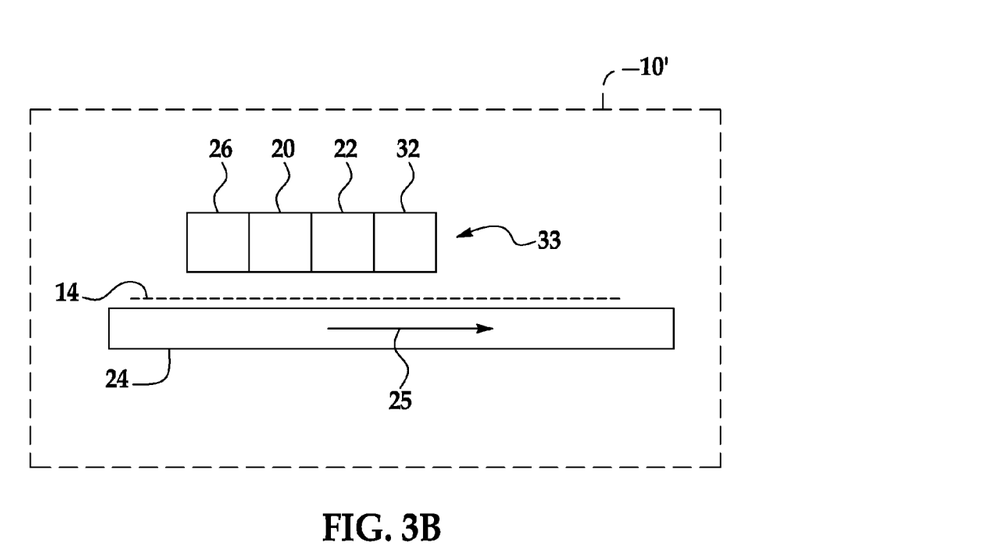

FIGS. 3A and 3B illustrate embodiments of a flat bed inkjet printing apparatus 10 and 10' suitable for performing the method described in reference to FIG. 1. These embodiments each include a support 24 that is configured to hold and move the substrate 14 throughout the printing process, as well as a printhead assembly 26, the UV radiation source 20, and the liquid coating unit 22 as previously described herein. These embodiments of the device 10 and 10' also include a single ink curing and liquid removal unit 32, which is one device capable of performing curing and liquid removal operations.

The printing apparatus 10 of FIG. 3A includes include a support 24 (e.g., a table or a bed) upon which the substrate 14 to be printed upon is mounted. The support 24 is configured to move in the direction of the arrow 25, and is configured to move the substrate 14 mounted thereon in the same direction. When in operation, the support 24 passes by each of the printing apparatus components in a sequential manner.

The printhead assembly 26 is any suitable inkjet printhead that can print the selected UV curable ink 12. Non-limiting examples of suitable inkjet printheads include piezoelectric inkjet printheads. When the substrate 14 passes by the printhead assembly 26, UV curable ink 12 (either held in a cartridge integrally formed with the printhead assembly 26 or received from another ink supply unit in fluid communication with the printhead assembly) is dispensed through one or more orifices of the printhead onto the adjacent substrate 14.

As illustrated in FIG. 3A, the pinning UV radiation source 20 is located downstream of the printhead assembly 26 and upstream of the liquid coating unit 22. As previously described in reference to both FIGS. 1 and 2A, the pinning UV radiation source 20 pins the previously printed ink 12 (not shown in FIG. 3A) such that the cured ink crust 12' is formed and the ink 12 is not fully cured.

The support 24 and substrate 14 are then moved to the liquid coating unit 22. As previously described in reference to both FIGS. 1 and 2B, the liquid coating unit 22 deposits the liquid (or solution) 16 in a manner sufficient to form a liquid coating on the previously pinned ink 12.

When the substrate 14 having the printed, pinned, and coated ink thereon is moved in proximity to the single ink curing and liquid removal unit 32, the unit 32 is operated in a manner sufficient to both cure the ink 12 and fully remove the liquid coating 16. In one example, the single ink curing and liquid removal unit 32 is a lamp that generates both UV radiation and IR radiation. The UV radiation cures the ink 12 while the IR radiation is absorbed by the liquid coating 16. The absorption of the IR radiation causes the liquid coating 16 to heat up and then evaporate. Generation of IR radiation is desirable for liquid coating 16 removal in this embodiment. In other embodiments where cold curing sources, such as LEDs, are used, an additional IR liquid evaporating source may be used.

As mentioned above, still another embodiment of a flat bed printing apparatus 10' is shown in FIG. 3B. This embodiment includes the support 24 configured to hold and move the substrate 14 throughout the printing process, as well as the printhead assembly 26, the pinning UV radiation source 20, the liquid coating unit 22, and the single ink curing and liquid removal unit 32. In this embodiment, the components 26, 20, 22, and 32 are a single static unit 33 (e.g., mounted to a support, not shown) that does not move. Rather, the substrate 14 is moved relative to the single static unit 33 so that printing, pinning, liquid coating, and curing/evaporation are performed simultaneously on different image segments.

Figure 4:
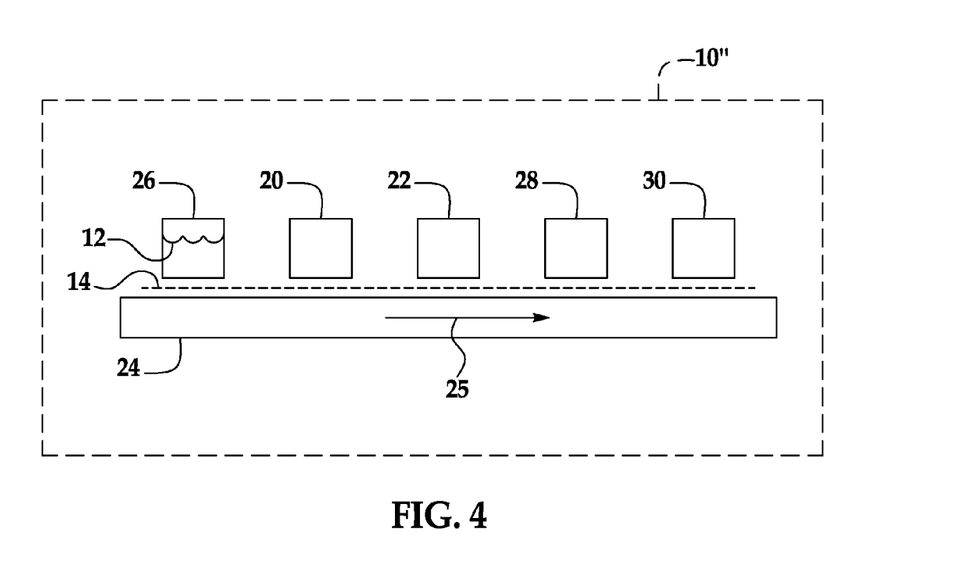
FIG. 4 is a schematic diagram of another embodiment of a flat bed UV printing apparatus.

FIG. 4 illustrates another embodiment of a flat bed inkjet printing apparatus 10" suitable for performing the method described in reference to FIG. 1. This embodiment of the printing apparatus 10" includes one ink curing unit 28 and a separate fluid removal unit 30. When in operation, the support 24 passes by each of the printing apparatus components (including, in this embodiment, the printhead assembly 26, the pinning UV radiation source 20, the fluid coating unit 22, the ink curing unit 28, and the fluid removal unit 30, which may or may not be included) in a sequential manner.

Since the ink curing unit 28 in this embodiment is used for ink curing (and not necessarily for liquid coating 16 removal), and the intensity required to cure the liquid coating 16-covered ink 12, 12' is relatively low, the curing unit 28 may be the same type or similar type of device as that is selected for the pinning UV radiation source 20. For example, both the source 20 and the unit 28 may be low power (e.g., capable of emitting from about 5 mj/cm$^2$ of UV energy to about 70 mj/cm$^2$ of UV energy) UV sources. When the substrate 14 having the printed, pinned, and coated ink thereon is moved in proximity to the ink curing unit 28, the ink curing unit 28 is operated in a manner sufficient to fully cure the ink 12.

UV curing units 28 emit some IR radiation, and as previously described, this can initiate evaporation of the liquid coating 16. In one embodiment, a separate fluid removal unit 30 may be included to ensure that the liquid coating 16 is removed. As previously mentioned, non-limiting examples of separate liquid removal units 30 include suction units, sweeping units, and IR radiation sources. When the substrate 14 having the printed, pinned, coated, and cured ink thereon is moved in proximity to the fluid removal unit 30, the fluid removal unit 30 is operated in a manner sufficient to fully remove the liquid coating 16.

In one embodiment, the flat bed inkjet printing apparatus 10, 10', 10" is a wide format printer capable of printing on a wide substrate 14.

Figure 5:
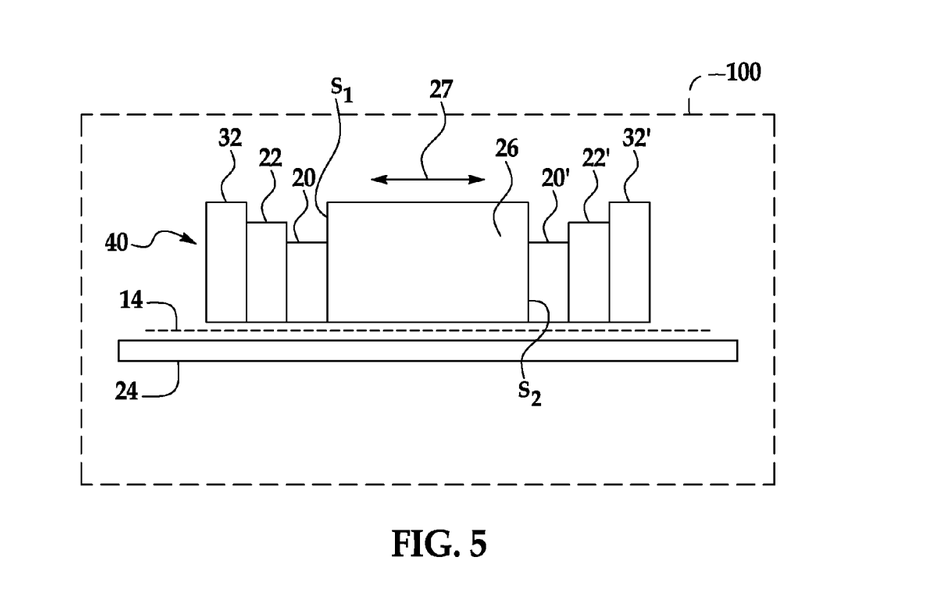
FIG. 5 is a schematic diagram of an embodiment of a roll-to-roll UV printing apparatus.
Figure 6:
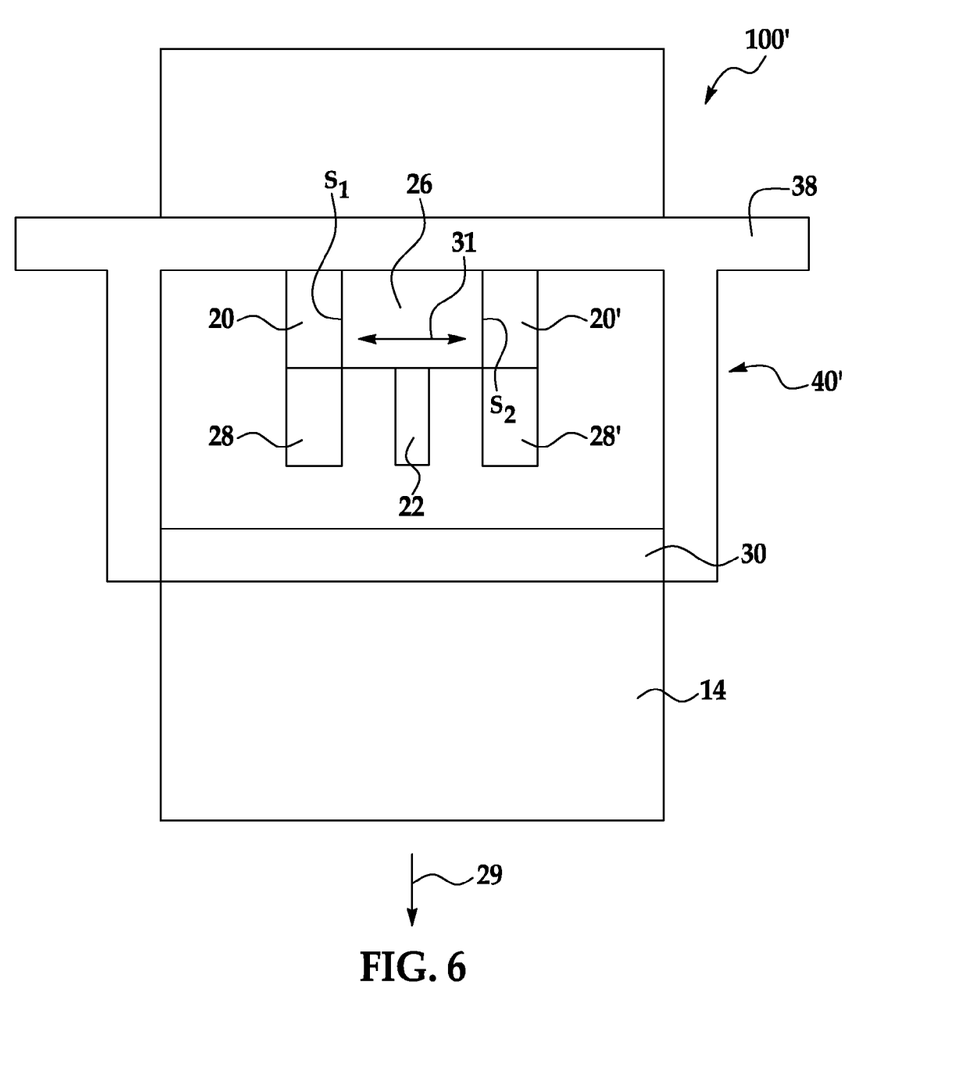
FIG. 6 is a schematic diagram of another embodiment of a roll-to-roll UV printing apparatus.

Referring now to FIGS. 5 and 6, embodiments of a roll-to-roll printing apparatus 100, 100' are respectively depicted. In one embodiment, the roll-to-roll printing apparatuses 100, 100' are wide format printers configured to print on a wide flexible substrate.

In a roll-to-roll printing apparatus 100, 100', the components 26, 20, 22, 28, and/or 32 are adhered together or attached to a support structure 38 (not shown in FIG. 5) to form an integrated device 40 (see FIG. 5), 40' (see FIG. 6). It is to be understood that any arrangements of the components 26, 20, 22, 28, 30 and/or 32 may be utilized, as long as the method shown and described in reference to FIG. 1 can be performed.

Referring now specifically to FIG. 5, one embodiment of the apparatus 100 including one embodiment of the integrated device 40 is shown. The apparatus includes a support 24 over which the substrate 14 is pulled or moved. While not shown in FIG. 5, it is to be understood that the substrate 14 is pulled in a direction that extends into or out of the paper.

The integrated unit 40 is positioned adjacent to the moving substrate 14 so that each component 26, 20, 22, 28, 30 and/or 32 can perform its respective function(s) on the substrate 14.

The printhead assembly 26 of the integrated unit 40 may be any of the examples disclosed herein. The printhead assembly 26 includes two opposed sides $S_1$, $S_2$. As illustrated in FIG. 5, each opposed side $S_1$, $S_2$ has attached thereto a respective pinning UV radiation source 20, 20'. Each of the pinning UV radiation sources 20, 20' has attached thereto a respective liquid coating unit 22, 22'. In this embodiment, each of the liquid coating units 22, 22' has attached thereto a respective single curing and liquid removal unit 32, 32'. In another embodiment, each of the single curing and liquid removal units 32, 32' is replaced with separate curing units 28 and liquid removal units 30, where a curing unit is attached to the liquid coating unit 22 or 22' and a liquid removal unit is attached to the curing unit. In another embodiment, the various components 26, 20, 20', 22, 22', 32, and 32' may not be in direct contact with one another as shown in FIG. 5, but may be attached to a support structure that enables them to move in the desired direction with respect to each other.

The integrated unit 40 moves relative to the substrate 14 in a reciprocating manner as indicated by arrow 27. Unlike the printing apparatuses 10, 10' which essentially perform the various steps substantially sequentially (except when steps are performed simultaneously on different image segments), the embodiment of the printing apparatus 100 (and 100') may be operated in multi-pass mode, where different segments of the same image are printed, pinned, coated, cured, and/or subject to liquid coating removal by different passes and at different times. It is to be understood that pinning, application of the liquid coating 16, curing, and liquid coating removal may be performed on image segments, rather than performing one step at a time on the entire printed image. In this embodiment, the pinning of the ink 12 is sufficient to hold the uncured ink 12 in place to prevent bleeding and undesired ink spread. In all of the embodiments of the printing apparatus 100, 100', the UV radiation source 20 is attached to the printhead 26. It is to be understood that changing the distance between the UV radiation source 20 and the printhead 26 can assist in controlling ink spread and provide proper ink coverage, as is described in U.S. Patent App. Pub. No. 2007/0273739.

In the embodiment shown in FIG. 5, when the integrated unit 40 moves rightward, the print head 26 deposits ink, the pinning UV source 20 pins the deposited ink 12, the liquid coating unit 22 deposits the liquid coating 16 on the pinned ink, and the single curing and liquid removal unit 32 cures the remaining uncured and coated ink and removes the liquid coating 16 in a suitable manner. When the carriage integrated unit 40 moves leftward, the print head 26 deposits ink, and the pinning UV source 20' pins the deposited ink 12, the liquid coating unit 22' deposits the liquid coating 16 on the deposited and pinned ink, and the single curing unit and liquid removal unit 32' cures the ink and removes the liquid coating 16 in a suitable manner. The substrate 14 is moved as printing occurs so that the desired image is achieved.

A more detailed embodiment of the roll-to-roll printing apparatus 100' is shown in FIG. 6. In this embodiment, the printhead assembly 26 of the integrated unit 40' may be any of the examples disclosed herein, and includes two opposed sides $S_1$, $S_2$. As illustrated in FIG. 6, each opposed side $S_1$, $S_2$ is adjacent to a respective pinning UV radiation source 20, 20'. In this embodiment, the UV radiation sources 20 and 20' are connected to curing units 28 and 28', respectively. As shown in FIG. 6, the sources 20, 20' and units 28, 28' are separate UV lamps, although they may be the identical kind of UV lamp. In another embodiment, the source 20 and unit 28 and the source 20' and unit 28' may be the same lamp. The source 20 and unit 28 or source 20' and unit 28' may be operated simultaneously, in order to pin one image segment while curing another image segment (which has previously been pinned and has the liquid coating 16 thereon). Respective sources 20, 20' and units 28, 28' are positioned adjacent to the opposed sides $S_1$, $S_2$ of the printhead(s) 26 and are supported by structure 38.

In this embodiment, the liquid dispensing unit 22 is positioned adjacent to the printhead(s) 26 such that ink is dispensed from the printhead(s) 26 onto one area of substrate 14 and the liquid or solution is dispensed from the liquid dispensing unit 22 on another area of the substrate 14 that already has pinned ink thereon. The liquid dispensing unit 22 is also positioned between the curing units 28, 28'.

This embodiment includes a separate liquid removal unit 30 positioned downstream of where printing, pinning, liquid coating, and curing take place. The liquid removal unit 30 may be supported by the support structure 38 as shown in FIG. 6, or may be a separate component not connected to the support structure 38. The liquid removal unit 30 in this embodiment extends the width of the substrate 14. As the substrate 14, having cured ink printed thereon covered by a liquid coating 16, passes by the liquid removal unit 30, the unit 30 will operate to remove any remaining liquid coating 16 from the portion of the substrate 14 exposed to the liquid removal unit 30. Liquid removal is performed along the entire width of the substrate 14, and is also performed on different image segments along the length of the substrate 14 at different times.

The roll-to-roll printing apparatus 100' may be of any known type such as, for example, one that typically pulls a flexible printing substrate 14 from a supply roll (not shown) over the substrate support (not shown) to a receiving roll (not shown). The components 26, 22, 20, 20', 28, 28' and 30 of the integrated device 40' are supported by the support structure 38 over the path of movement of the substrate 14. More particularly, the support structure or bridge 38 is static, but allows the components 26, 22, 20, 20', 28, and 28' to move in a reciprocating motion with respect to the movement of the substrate 14 while allowing component 30 to remain stationary/static. The reciprocal direction, represented by arrow 31, is transverse to the direction, represented by arrow 29, of movement of the substrate 14. In this example, the directions 31 and 29 are orthogonal. These two orthogonal movements allow ink droplet deposition at every location of the substrate 14, as is desirable.

The printhead(s) 26 are moved to deposit ink droplets on the substrate 14. The UV radiation sources 20, 20' are moved and activated to pin the deposited ink. In one example, a first pass will print and pin the ink. In this example, as the paper is moved in direction 29, a second pass in the opposite direction from the first pass will allow the liquid coating unit 22 to deposit the liquid coating 16 on the pinned ink, and the curing units 28, 28' to cure the liquid coated ink. For example, when the components 26, 22, 20, 20', 28 and 28' move rightwards the print head 26 deposits ink, and the pinning UV source 20 pins the deposited ink 12. The substrate 14 will then be moved in direction 29 and when the components 26, 22, 20, 20', 28 and 28' move leftwards, the liquid coating unit 22 will deposit the liquid or solution and form the liquid coating 16 on the previously dispensed and pinned ink. Further movement of the components 26, 22, 20, 20', 28 and 28' allow the curing unit 28' to cure the liquid coated ink. The substrate 14 will again be moved in direction 29 to remove the liquid coating 16 via liquid removal unit 30.

Each of the components 26, 22, 20, 20', 28 and 28' may be in a permanently fixed position(s) relative to each other. Alternatively, the positions of the components 26, 22, 20, 20', 28 and 28' may be adjustable allowing for adjustment to the distance between two or more of the components 26, 22, 20, 20', 28 and 28'.

In still other embodiments, the substrate 14 may be static and the components 26, 22, 20, 20', 28, 28' and 30 may move in two orthogonal directions. Examples of such printers are the HP Scitex 6500, HP Scitex 2300, and others available from the Hewlett Packard Company.

It is to be understood that any of the embodiments of the various components 26, 20, 22, 28, 30, 32, and 44 described in reference to one embodiment of a printing apparatus 10, 10', 10", 100, 100' may be suitable for any other embodiment of a printing apparatus 10, 10', 10", 100, 100'. Any other suitable combinations of the components 26, 20, 22, 28, 30, 32, and 44 that can perform the method as shown and described in reference to FIG. 1 are contemplated as being within the purview of this disclosure.

Any of the embodiments of the printing apparatuses 10, 10', 100, 100' disclosed herein may be operatively connected to a processor that is capable of running suitable software routines or programs for generating commands for the various components to reproduce desired images. Other electronics may be used to operatively connect the various components.

To further illustrate embodiment(s) of the present disclosure, examples are given herein. It is to be understood that these examples are provided for illustrative purposes and are not to be construed as limiting the scope of the disclosed embodiment(s).

EXAMPLES

Each of the examples disclosed herein was conducted using a self adhesive vinyl as a substrate. The ink used was HP Scitex UV curable Magenta ink TJ 200. The substrate was coated with ink using well known rod drawdown substrate coating methods. The coated substrate was placed on a conveyor belt and passed under an LED pinning radiation UV source (e.g., Phoseon StarFire 75, which is commercially available from Phoseon, Hillsboro, Oreg.) which provides up to 70 mj/cm$^2$ of UV energy. Following ink pinning a thin layer of water with 0.5% surfactant DYNAX 4000 was sprayed over the pinned ink, and the ink was completely cured at different conveyor belt speeds.

The comparative examples were prepared in a similar manner using another UV radiation source for curing. This other UV radiation source had a higher power than the pinning radiation UV source. The comparative examples were prepared without the pinning step and without the application of the liquid coating.

Example 1 and Comparative Example 1

In this example, the HP Scitex Magenta ink TJ 200 was drawn on the vinyl substrate, and was pinned by one pass of the coated substrate under the pinning radiation UV source. Water was sprayed over the ink and substrate to form a water layer. The speed of the substrate was 0.5 m/sec. The next pass under the same radiation UV source resulted in a fully cured 12 micron thick image.

In order to achieve similar curing of a similar ink on a similar substrate in the presence of atmospheric oxygen (i.e., no water layer was applied) by the other UV source, five additional passes under the other UV source were required.

Example 2 and Comparative Example 2

In this example, the HP Scitex Magenta ink TJ 200 was drawn on the vinyl substrate, and was pinned by one pass of the coated substrate under the pinning radiation UV source. Water was sprayed over the ink and substrate to form a water layer. The speed of the substrate was 0.5 m/sec. The next pass under the same radiation UV source resulted in a fully cured 24 micron thick image.

In order to achieve similar curing of a similar ink (24 microns thick) on a similar substrate in the presence of atmospheric oxygen (i.e., no water layer was applied) by the other UV source, 15 total passes under the other UV source were required.

Example 3 and Comparative Example 3

In this example, the HP Scitex Magenta ink TJ 200 was drawn on the vinyl substrate, and was pinned by one pass of the coated substrate under the pinning radiation UV source. Water was sprayed over the ink and substrate to form a water layer. The speed of the substrate was 1 m/sec. The next pass under the same radiation UV source resulted in a fully cured 24 micron thick image.

In order to achieve similar curing of a similar ink (24 microns thick) on a similar substrate in the presence of atmospheric oxygen (i.e., no water layer was applied) by the other UV source, 20 total passes under the other UV source were required.

Example 4 and Comparative Example 4

In this example, the HP Scitex Magenta ink TJ 200 was drawn on the vinyl substrate, and was pinned by one pass of the coated substrate under the pinning radiation UV source. Water was sprayed over the ink and substrate to form a water layer. The speed of the substrate was 1.8 m/sec. The next pass under the same radiation UV source resulted in a fully cured 12 micron thick image.

In order to achieve similar curing of a similar ink (12 microns thick) on a similar substrate in the presence of atmospheric oxygen (i.e., no water layer was applied) by the other UV source, 30 total passes under the other UV source were required.

Example 5 and Comparative Example 5

In this example, the HP Scitex Magenta ink TJ 200 was drawn on the vinyl substrate, and was pinned by one pass of the coated substrate under the pinning radiation UV source. Water was sprayed over the ink and substrate to form a water layer. The speed of the substrate was 1.8 m/sec. Two additional passes under the same radiation UV source resulted in a fully cured 24 micron thick image.

In order to achieve similar curing of a similar ink (24 microns thick) on a similar substrate in the presence of atmospheric oxygen (i.e., no water layer was applied) by the other UV source, more than 30 total passes under the other UV source were required.

It is to be understood that the ranges provided herein include the stated range and any value or sub-range within the stated range. For example, an amount ranging from about 1 wt % to about 20 wt % should be interpreted to include not only the explicitly recited amount limits of about 1 wt % to about 20 wt %, but also to include individual amounts, such as 2 wt %, 3 wt %, 4 wt %, etc., and sub-ranges, such as 5 wt % to 15 wt %, 10 wt % to 20 wt %, etc. Furthermore, when "about" is utilized to describe a value, this is meant to encompass minor variations (up to 0.3) from the stated value.

While several embodiments have been described in detail, it will be apparent to those skilled in the art that the disclosed embodiments may be modified. Therefore, the foregoing description is to be considered non-limiting.

What is claimed is:

1. An inkjet printing apparatus for printing ultraviolet (UV) curable ink, comprising:
    a printhead assembly for printing the UV curable ink on a substrate;
    a UV radiation source for pinning the UV curable ink when printed on the surface of the substrate;
    a liquid coating unit for dispensing a liquid coating on the printed and pinned UV curable ink, the liquid coating preventing contact between atmospheric oxygen and the printed and pinned UV curable ink, wherein the liquid of the liquid coating is transparent to UV radiation so that the printed and pinned UV curable ink lying thereunder can be fully cured while the liquid coating remains coated on the UV curable ink;
    an ink curing unit for fully curing the printed, pinned, and coated UV curable ink; and
    a liquid removal unit for removing the liquid coating from the printed and pinned UV curable ink.

2. The inkjet printing apparatus as defined in claim 1 wherein:
   the ink curing unit and the liquid removal unit are a single ink curing and liquid removal unit, and each of the printhead assembly, the UV radiation source, the liquid coating unit, and the single ink curing and liquid removal unit is a separate unit; or
   the ink curing unit and the liquid removal unit are a single ink curing and liquid removal unit, and the printhead assembly, the UV radiation source, the liquid coating unit, and the single ink curing and liquid removal unit are attached to form a single integrated unit; or
   each of the printhead assembly, the UV radiation source, the liquid coating unit, the ink curing unit, and the liquid removal unit is a separate unit.

3. The inkjet printing apparatus as defined in claim 2, wherein:
   each of the printhead assembly, the UV radiation source, the liquid coating unit, and the single ink curing and liquid removal unit is a separate unit, and the printing apparatus further comprises a support positioned adjacent to each of the separate units, the support holding the substrate and moving the substrate past each of the separate units sequentially; or
   each of the printhead assembly, the UV radiation source, the liquid coating unit, and the single ink curing and liquid removal unit is a separate unit integrated into a single static unit, and the printing apparatus further comprises a support positioned adjacent to the single static assembly, the support holding the substrate and moving the substrate past the single static unit.

4. The inkjet printing as defined in claim 2, wherein the printhead assembly of the single integrated unit includes two opposed sides ($S_1$, $S_2$), wherein the UV radiation source, the liquid coating unit, and the single ink curing and liquid removal unit are attached to one ($S_1$) of the two opposed sides ($S_1$, $S_2$), and wherein the printing apparatus further comprises:
   a second UV radiation source attached to another ($S_2$) of the two opposed sides ($S_1$, $S_2$);
   a second liquid coating unit attached to the second UV radiation source; and
   a second single ink curing and liquid removal unit attached to the second liquid coating unit.

5. The inkjet printing apparatus as defined in claim 4 wherein the single integrated unit is configured to operate in a reciprocating movement, and wherein the printing apparatus further comprises a support positioned adjacent to the single integrated unit, wherein the support is for holding the substrate and moving the substrate past the single integrated unit in a direction perpendicular to the reciprocating movement of the single integrated unit.

6. The inkjet printing as defined in claim 1, further comprising one of:
   water contained in the liquid coating unit; or
   a solution contained in the liquid coating unit, wherein the solution includes a surfactant, and the liquid that is transparent to UV radiation.

7. The inkjet printing apparatus as defined in claim 6 wherein the liquid absorbs infrared (IR) radiation.

8. The inkjet printing apparatus as defined in claim 6 wherein the liquid is water and wherein an amount of the surfactant ranges from about 0.1 wt % to about 0.5 wt % of a total wt % of the solution.

9. The inkjet printing apparatus as defined in claim 1 wherein the UV radiation source is configured to emit at least 5 $mj/cm^2$ of UV energy.

10. A printing method, comprising:
    depositing a UV curable ink on at least a portion of a substrate;
    exposing the printed UV curable ink to UV radiation sufficient to pin the printed UV curable ink;
    creating an oxygen free atmosphere for curing by depositing a liquid on the pinned and printed UV curable ink to form a liquid coating, wherein the liquid of the liquid coating is transparent to UV radiation so that the printed and pinned UV curable ink lying thereunder can be fully cured while the liquid coating remains coated on the UV curable ink;
    exposing the pinned, printed, and coating UV curable ink to UV radiation sufficient to cure the UV curable ink, and
    removing the liquid coating, by a liquid removal unit, from the printed and pinned UV curable ink.

11. The printing method as defined in claim 10 wherein the liquid is a solution that includes a surfactant that is transparent to the UV radiation, and the liquid that is transparent to the UV radiation and prevents the contact of oxygen with the printed and pinned UV curable ink.

12. A method, comprising:
    incorporating, into a printing apparatus, a UV radiation source a predetermined distance from an inkjet printhead, the UV radiation source for pinning a UV curable ink printed on a surface of a substrate;
    selecting a liquid, that when dispensed on the printed and pinned UV ink will form an oxygen free atmosphere around the printed and pinned UV ink, wherein the liquid is transparent to UV radiation so that the printed and pinned UV curable ink lying thereunder can be fully cured while the liquid coating remains coated on the UV curable ink:
    introducing the liquid into a liquid coating unit;
    incorporating, into the printing apparatus, the liquid coating unit for dispensing the liquid on the printed and pinned UV ink;
    incorporating, into the printing apparatus, an ink curing unit for curing the printed, pinned, and coated UV curable ink and;
    incorporating, into the printing apparatus, a fluid removal unit for removing the liquid coating from the printed and pinned UV curable ink.

* * * * *

UNITED STATES PATENT AND TRADEMARK OFFICE
CERTIFICATE OF CORRECTION

PATENT NO.         : 9,676,209 B2                                   Page 1 of 1
APPLICATION NO.    : 13/806502
DATED              : June 13, 2017
INVENTOR(S)        : Alex Veis It is certified that error appears in the above-identified patent and that said Letters Patent is hereby corrected as shown below:

In Column 11, Line 54, in Claim 6, delete "printing as" and insert -- printing apparatus as --, therefor.

In Column 12, Line 45, in Claim 12, delete "ink:" and insert -- ink; --, therefor.

Signed and Sealed this
Nineteenth Day of September, 2017

Joseph Matal
*Performing the Functions and Duties of the*
*Under Secretary of Commerce for Intellectual Property and*
*Director of the United States Patent and Trademark Office*